UNITED STATES PATENT OFFICE.

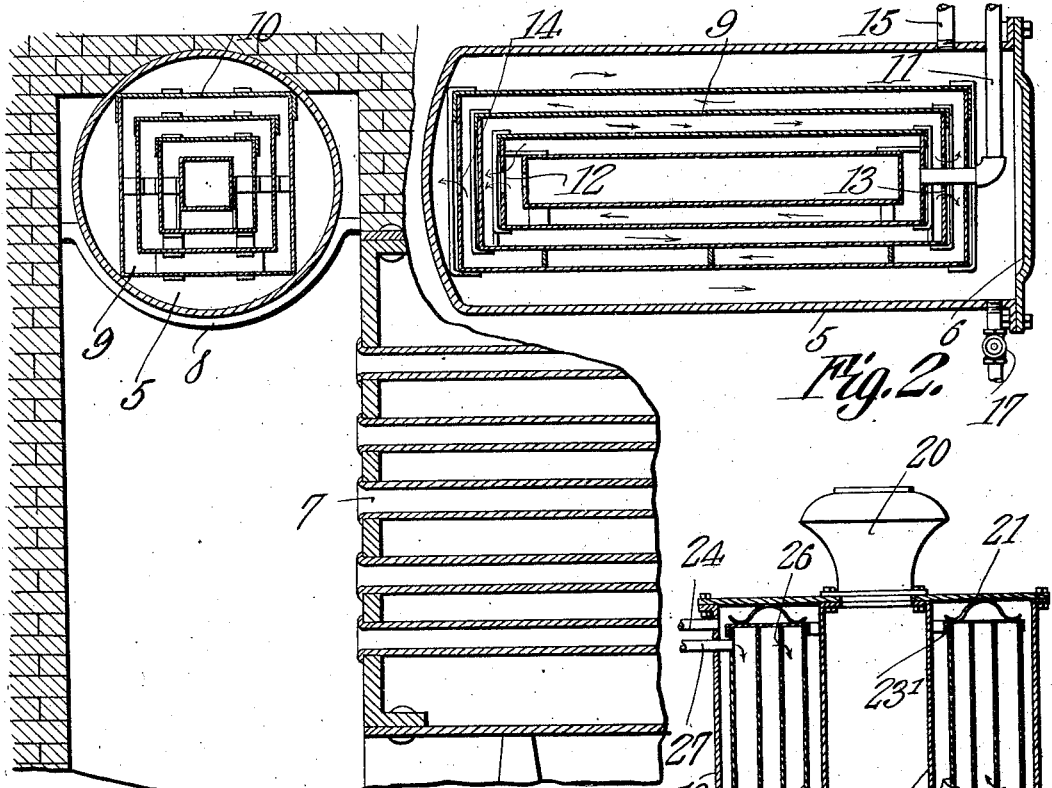

AMOS A. AMSTUTZ, OF BLUFFTON, OHIO.

FEED-WATER HEATER.

954,157.  Specification of Letters Patent.  Patented Apr. 5, 1910.

Application filed July 2, 1909. Serial No. 505,721.

*To all whom it may concern:*

Be it known that I, AMOS A. AMSTUTZ, a citizen of the United States, residing at Bluffton, in the county of Allen and State of Ohio, have invented a new and useful Feed-Water Heater, of which the following is a specification.

This invention relates to feed water heaters of that kind in which the smoke and other products of combustion are utilized, and it has for its object to provide novel and improved means for causing a circulation of the water in the heater, and also for purifying the same.

Another object of the invention is to provide a heater which can be readily applied to the boiler without any modification or alteration in the structure thereof.

With these objects in view the invention consists in a novel construction and arrangement of parts to be hereinafter described and claimed, reference being had to the drawing hereto annexed, in which:—

Figure 1 is a transverse section of one form of heater. Fig. 2 is a horizontal section thereof. Fig. 3 is a vertical section of another form of heater. Fig. 4 is a horizontal section thereof.

In Figs. 1 and 2 the invention is shown applied to a stationary horizontal return tubular boiler. The heater comprises a cylindrical tank 5, closed at one end by a removable head 6, in order that access to the interior of the tank may be had. This tank is mounted above the rear ends of the flues 7 of the boiler, on the rear wall of the boiler setting, it being supported in stirrups 8, or other suitable means, fastened to said wall. The tank is of a length so as to extend throughout the entire width of the boiler.

Within the tank 5 is mounted a series of casings 9, which are nested and spaced apart from each other. Each casing is provided with an opening, so that the water may flow from one into the other throughout the entire series. The casings are preferably rectangular in form, and they are spaced from each other by any suitable means, the first or outer one of the casings being also spaced from the inner wall of the tank.

The casings 9 are removable from the tank 5 upon taking off the head 6, and each casing has a removable cover 10 in order that it may be emptied of the sediment collecting therein. The covers are held in place by any suitable fastening means or clamps. The last or innermost casing is provided with an opening in its end adjacent the opening 12 in order that the water may enter said casing so that the pressure may be equal on the inside and outside of the same. The function of this casing, however, is to provide a narrow channel within the next surrounding casing through which the water may flow. The other casings also form narrow spaces in the casings in which they are mounted, thus causing the water to circulate through the heater in a thin stream, whereby it is more rapidly heated.

The inlet pipe of the heater is indicated at 11. Said pipe extends into the tank through the side wall thereof, and passes through the walls of the casings 9 at one of the ends thereof, and opens into the casing which incloses the innermost one. The opposite end of the casing which is entered by the inlet pipe has an opening 12, through which the water flows into the next casing, and in this last mentioned casing in that end which is opposite the opening 12, are openings 13, through which the water flows into the next casing. The end wall of the last mentioned casing has an opening 14, which communicates with the interior of the tank 5. This last mentioned opening is made in that end of the casing which is opposite the end at which the water enters through the openings 13. From the tank the water is carried to the boiler by a pipe 15 entering the tank adjacent that end which is opposite the end at which the water enters the tank through the opening 14.

By the herein described arrangement of nested casings the water is caused to flow through the heater in a thin, tortuous stream, whereby it will be quickly heated, the tank being located so as to be exposed to the smoke and other waste products of combustion. Impurities present in the water will settle in the several casings, which, as already described may be removed for disposal of the sediment, and the heater is therefore also made to serve as a water-purifier. The tank is also fitted with a blow-off valve 17, for emptying the same.

The heater is simple in structure, and can be readily applied to the boiler, no modification or changes in the structure thereof being required, and it effectually serves the purpose for which it is designed.

The heater shown in Figs. 3 and 4 is designed for use in connection with a portable boiler, said boiler being indicated at 18, the boiler of a traction engine being shown. This form of heater comprises an upstanding cylindrical tank 19, mounted on the front end of the boiler, so as to inclose the stack 20. The top of the tank is provided with a removable cover 21, and at the center of the tank is a flue 22, the wall of which may be furnished by the stack, the head of the stack being bolted to the cover 21. The wall of the flue forms an annular space in the interior of the tank, in which space is mounted a series of concentric drums 23, these drums being spaced from each other and closed at their ends. The closure for the upper ends of the drums is removable and springs 23′ may be provided to press down upon said closure to hold the same in position while the device is in use. The outer drum is spaced from the side wall of the tank, and the drums are also spaced from the cover or head 21. The water inlet pipe 24 extends through the side wall of the tank 19, and also through the first or outer drum 23 near the top thereof, so that the water first flows into the space between the first and second drum. In the second drum, near the bottom thereof, and diametrically opposite the point of entrance of the inlet pipe, is an opening 25, through which the water flows into the space between the second and third drums. From this space the water flows into the space between the third and fourth drums through an opening 26, made in the third drum near the top thereof, diametrically opposite the opening 25, and so on throughout the entire series, the water entering one drum at the bottom and the next drum at the top. The space between the innermost drum and the wall of the flue 22 is open at its lower end, and the water flows from this space into the tank 19, from which it is carried to the boiler by a pipe 27, entering the tank.

By the herein described arrangement of drums the water flows through the heater in a tortuous path, and is therefore rapidly heated. The sediment also settles to the bottom of the drums; from which it may be removed by taking the drums out of the tank. To the bottom of the tank is fitted a blow-off valve 28 and the heater may be provided with the usual pressure gage, safety-valve, and water tube.

What is claimed is:—

A feed water heater comprising a tank having an outlet, a series of nested casings mounted in the tank and spaced from each other, said casings with the exception of the innermost one having openings in one of their ends, the opening of one casing being at the end opposite to that end in which the opening of the next casing is made, and the opening of the outermost casing communicating with the tank, and an inlet pipe extending into the casing which surrounds the innermost one, said innermost casing serving to provide a narrow channel within the next surrounding casing, and having an opening opposite the opening of said surrounding casing to permit the entry of water into said innermost casing for the purpose of equalizing the pressure.

In testimony that I claim the foregoing as my own, I have hereto affixed my signature in the presence of two witnesses.

AMOS A. AMSTUTZ.

Witnesses:
JAMES W. JACKSON,
HENRY L. ROMEY.